Jan. 18, 1955   M. FINK   2,699,619
PORTABLE VIEWER FOR PHOTOGRAPHIC TRANSPARENCIES
Filed Aug. 13, 1953   3 Sheets-Sheet 1

INVENTOR
MORRIS FINK
BY
James F. Franklin
ATTORNEYS

Jan. 18, 1955   M. FINK   2,699,619
PORTABLE VIEWER FOR PHOTOGRAPHIC TRANSPARENCIES
Filed Aug. 13, 1953   3 Sheets-Sheet 2

INVENTOR
MORRIS FINK
BY James ... Franklin
ATTORNEYS

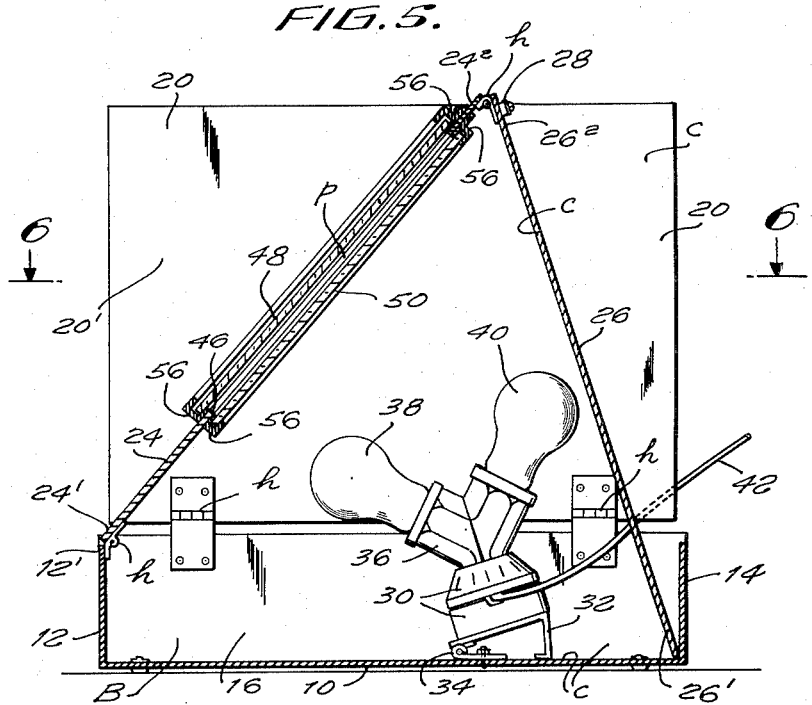
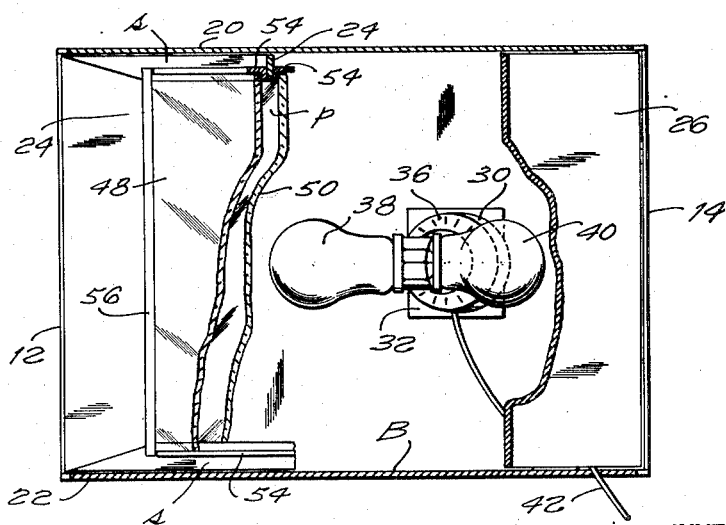

United States Patent Office 2,699,619
Patented Jan. 18, 1955

2,699,619

PORTABLE VIEWER FOR PHOTOGRAPHIC TRANSPARENCIES

Morris Fink, Kew Gardens Hills, N. Y.

Application August 13, 1953, Serial No. 373,959

12 Claims. (Cl. 40—130)

This invention relates to a portable viewer for photographic transparencies and especially for color transparencies, and more particularly to a portable viewer of this nature especially intended for industrial, but also adapted for home uses.

For direct viewing of color transparencies to bring out the more faithful reproduction of the colors and tints of the transparency, particularly under different and varying conditions of outside or room illumination, the solution of a number of inter-related problems is necessary. This is particularly so in the designing and constructing of a portable viewing apparatus where the parts are necessarily articulately arranged so as to be movable between a collapsed portable condition and a set-up viewing condition.

In such a viewing apparatus the ultimate requirements are generally threefold: (1) the production of balanced light conditions when the apparatus is set up for use; (2) the obtainment and maintenance of the desired color temperature of the light when the apparatus is in use; and (3) the designing of a portable instrument in which these ultimate results are achievable with a simple structural unit.

The production of balanced light conditions is, itself, dependent upon a number of inter-related factors. The light at the viewing transparency is required to be of a suitable intensity and of uniform distribution over the whole viewing area. To accomplish this the viewing window, itself, has to be constructed so as to provide an even light-diffusing surface; the interior light source (or sources) has to be positioned and relatively spaced so as to yield the correct incident or direct light impingement on to the viewing window; and the interior construction of the apparatus has to be so designed as to produce a uniformly distributed reflected light. Moreover, the incident and reflected light should be of the correct brightness or intensity, produceable with a light source or sources of relatively low wattage so as to minimize the generated heat.

For producing the correct color temperature of the light, the referred to parts of the viewer have to be properly organized and arranged particularly when moved to a set-up state. A proper range of color temperature desirably to be achieved is one between 3,400 and 3,800 degrees K. (Kelvin).

As a factor ancillary to the obtaining of the desired light intensity and distribution, it is required that the heat effective at the viewing window be low and constant, this so as not to subject the color transparency to any substantial amount of heat. To effectuate this the structure of the window itself should be one which provides a substantially insulated window for holding the transparency, and the viewer structure should be so designed that when it is moved to a set-up condition effective ventilation paths are produced for proper and rapid dissipation of the heat generated by the light source or sources.

A further ancillary desideratum is the production of a window structure to provide for exclusion of as much of the exterior or room illumination possible even though the light intensity produced at the viewing window should be and is many more times brilliant than that of the outside light. The viewer should, therefore, desirably be designed so as to provide for a shading blind for the viewing surface when the apparatus is in set-up condition.

The third referred to result is achieved when a portable viewing apparatus is constructed not only to carry out or bring about the solution of the inter-related factors above referred to, but is designed so that the organization as well as the manipulation of the parts are simple, enabling the viewer to be rapidly set up and collapsed, and readily carried as a portable unit.

The principal object of my present invention is the production of a portable color transparency viewer which meets the above requirements in an optimum way.

To the accomplishment of this prime object, and such other objects as may hereinafter appear, my present invention relates to the viewer apparatus as sought to be defined in the appended claims, and as described in the following specification and shown in exemplified form in the following drawings, in which:

Fig. 4 is a view thereof showing the parts moved to a nearly set-up condition;

Fig. 5 is a view of Fig. 4 taken in cross-section in the plane of the line 5—5 of Fig. 4; and Fig. 6 is a view of Fig. 5 taken in cross-section in the plane of the line 6—6 of Fig. 5.

Figure 1:
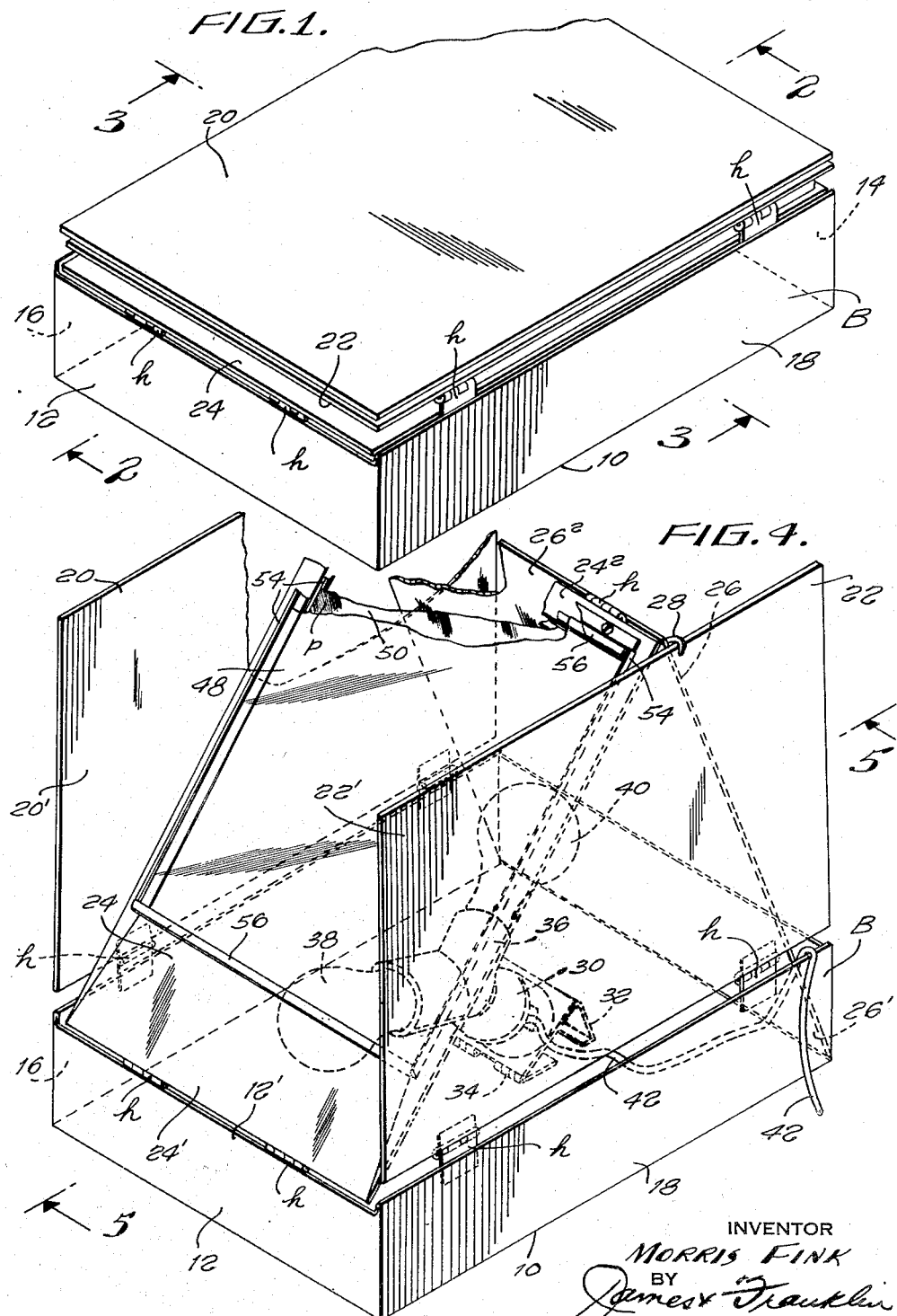
Fig. 1 is a perspective view of the viewer of the present invention in boxed or collapsed condition.
Figure 2:
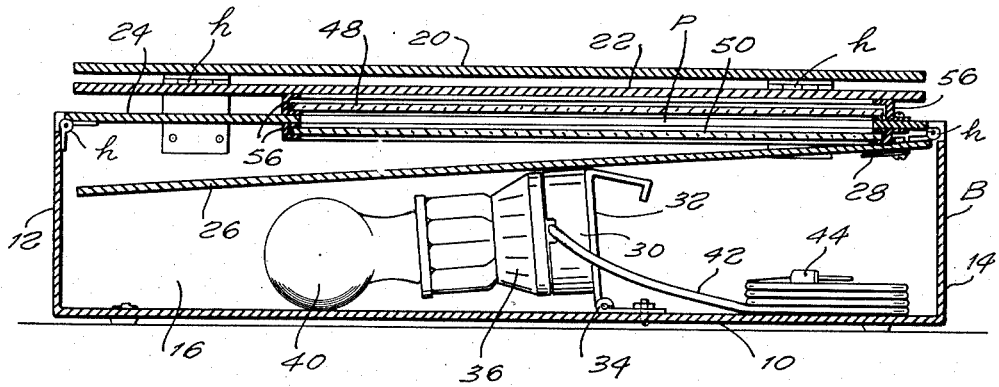
Fig. 2 is a view thereof taken mainly in cross-section in the plane of the line 2—2 of Fig. 1.
Figure 3:
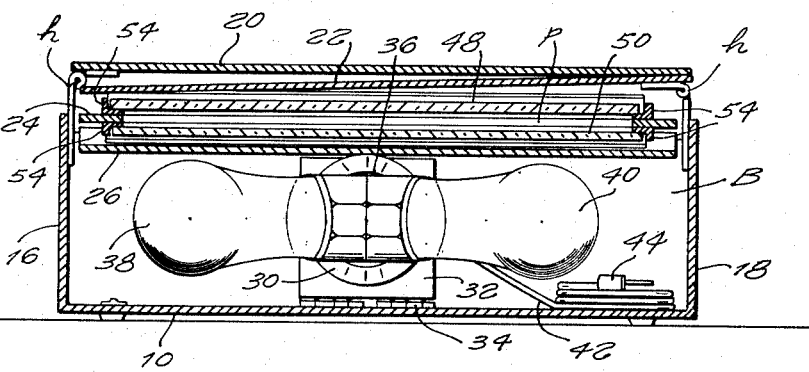
Fig. 3 is a view thereof taken mainly in cross-section in the plane of line 3—3 of Fig. 1.

Referring now more in detail to the drawings, the photographic transparency viewer of the invention comprises a portable unit, the parts of which are movable between the collapsed and portable condition depicted in Figs. 1 to 3, of the drawings, and a set-up transparency viewing condition depicted in Figs. 4 to 6 of the drawings.

The portable viewer comprises essentially a box-like container body B having a bottom wall 10, opposite end walls 12 and 14 and opposite side walls 16 and 18, lids 20 and 22 articulately connected respectively to the side walls 16 and 18, a viewing window structure 24 articulately connected at its bottom end $24^1$ to one of the end walls as, for example, the end wall 12, and preferably to the top $12^1$ of said end wall and a stand 26 for the window structure free at its lower end $26^1$ and articulately connected at its upper end $26^2$ to the other end or top end $24^2$ of the window structure. The articulate connection of these parts is preferably a hinged connection obtained by the use of spaced hinges designated for all of these parts as $h$, $h$.

The viewing window 24 and its stand 26 are of the rectangular form, as also are the lids 20 and 22; and these parts are of a dimensional configuration such that these parts are movable or articulatable into the collapsed and set-up conditions shown in the drawings to fulfill the following functional behavior and results: (1) when these parts are moved to the collapsed box condition shown in Figs. 1 to 3 the stand 26 is folded under the window structure 24, namely in overlapping position, and both the window structure and the stand assume the condition of defining the top for the container body B; (2) when these parts are moved to the set-up condition shown in Figs. 4 to 6 the window 24 and its stand 26 are angularly disposed, one with reference to the other, and are triangularly disposed with reference to the container body B, as best shown in Fig. 5, the window structure 24 being thereby placed at a desirable viewing angle and firmly held in this position by the stand 26, the lower or free end $26^1$ of which is firmly anchored in a corner edge of the container box B; the lids 20 and 22 previously having been moved from their collapsed position to an upright position, as best shown in Figs. 4 and 5, and made to rest against the opposite side edges of the window structure 24 and the stand 26 thereby defining the side walls for the set-up window and stand; (3) when the parts are moved to this set-up condition the window structure 24, the stand 26 and the oppositely positioned lids 20 and 22, together with the container body B, define an all-around enclosure for the light source (hereinafter described) which is portably contained in the viewer apparatus; and (4) the front sections of the now upright lids 20 and 22, which sections are designated as $20^1$ and $22^1$, define shading blinds for the viewing area of the window so as to substantially exclude side or lateral rays of an outside source, such as a room source, of illumination. The lids 20 and 22 may be secured in their upright position by being engaged by hooks 28, 28 pivoted at the top of the stand 26 (see particularly Figs. 1, 2 and 5).

The portable viewer is made to contain an electric light source holder which is arranged therein to be movavle or articulatable from a collapsed box condition, as shown in Figs. 2 and 3, to a window illuminating set-up condition, as shown in Figs. 4, 5 and 6. This electric light source holder comprises an electric receptacle 30 articulately connected to the container bottom 10 as by means of a receptacle holding bracket 32 movable on the container bottom 10 by means of the hinge 34 and a light source receiving receptacle 36 rotatably mounted in the electric receptacle 30, the rotatable receptacle 36 preferably bi-socketed for receiving the two lamps 38 and 40. By means of this construction and mounting of the light source holder the following functions and advantages are achieved:

1. The receptacle 36 with the lamps mounted therein is rotatable over an angle of 90 degrees from the position shown in Figs. 4 to 6, and in this position these parts together with the electric receptacle 30 are moved about the hinge 34 to the boxed or collapsed condition shown in Figs. 2 and 3 of the drawings;

2. By the reverse movements of these parts the light source holder is moved to the window illuminating set-up condition shown in Figs. 4 to 6 of the drawings; and 3. In the set-up condition the two light sources or lamps 38 and 40 are so arranged that the light thereof, which is directly incident upon spaced areas of the window structure together with the light reflected from the interior walls of the viewer produce upon the viewing area of the window the desired balanced light heretofore described. Also, the lamp receptacle 36 may be incrementally adjusted (rotatably) to vary or adjust for the desired light distribution.

To the electric receptacle is connected the electrical cord 42 terminating in the plug 44 which latter are also housed by the viewer container body B (see Fig. 2). As a factor in increasing the intensity illumination and producing the uniform distribution thereof the interior faces of the walls of the container body B, as well as the interior faces of the lids 20 and 22 and the stand 26, are surfaced to convert the same to diffusion reflectors, this being obtained by coating said surfaces with a white enamel coating (indicated as c in Fig. 5), the enamel being selected especially for long-lasting whiteness.

To assist in the rapid dissipation of the heat generated by the light sources the transverse dimensions of the window structure 24 and its stand 26 are somewhat less than those of the end walls 12 and 14, sufficient to leave ventilating area spaces s, s (best shown in Fig. 6) between the window structure 24 (and its stand 26) and the upright lids 20 and 22 when these parts are in set-up condition.

The window structure 24, itself, comprises a supporting plate provided at its window opening 46 with front and rear window plates 48 and 50 spaced by an insulating air pocket p. Each of these plates is mounted at its sides in angle pieces 54, 54 and at its top and bottom in U-shaped pieces 56, 56 secured to the plate 24, the U-shaped pieces 56, 56 for the front plate 48 being formed with spaces for receiving the color transparency which is mountable over the plate 48 for viewing purposes. The rear window plate 50 comprises a translucent light diffusing element and the front window plate 48 comprises a transparent element. By means of this construction the proper light diffusion is effected by the rear plate, and the front plate is insulated adequately to yield a cool transparency receiving and viewing surface.

The portable color transparency viewer of my invention, the manner of constructing the same, the manner of employing the same as a portable unit and for viewing transparencies, and the various advantages thereof are, in the main, believed to be fully apparent from the above detailed description. It will be fully apparent that changes may be made in the parts and their organization without departing from the spirit of the invention defined in the following claims.

I claim:

1. A portable photographic transparency viewer comprising a box-like container body having bottom, end and side walls, a lid articulately connected to each of the side walls, a viewing-window articulately connected at one of its ends to one of the end walls, a stand for the window free at one end and articulately connected at its other end to the other end of the window, the window and its stand being movable about their articulated connections between a collapsed boxed condition with the stand folded under the window and a set-up condition with the window and stand triangularly disposed with reference to the container body, the lids being movable in opposing directions about their articulated connections between an overlapping lid position and a generally upright position defining side walls for the set-up window and stand.

2. A portable photographic transparency viewer comprising a box-like container body having bottom, end and side walls, a pair of lids each articulately connected to a side wall, a viewing-window articulately connected at one of its ends to the top of one of the end walls, a stand for the window free at one end and articulately connected at its other end to the other end of the window, the window and its stand being movable about their articulated connections between a collapsed boxed condition with the stand folded under the window and both the window and the stand defining a top for the container body, and a set-up condition with the window and stand triangularly disposed with reference to the container body, the lids being movable in opposing directions about their articulated connections between an overlapping lid position superimposed on the collapsed window and stand and a generally upright position defining side walls for the set-up window and stand.

3. A portable photographic transparency viewer comprising a generally rectangular container body having bottom, end and side walls, a pair of lids each hingedly connected to a side wall, a viewing-window hingedly connected at one of its ends to one of the end walls, a stand for the window free at one end and hingedly connected at its other end to the other end of the window, the window and its stand being movable about their hinged connections between a collapsed boxed condition with the stand folded under the window and a set-up condition with the window and stand triangularly disposed with reference to the container body, the lids being movable in opposing directions about their hinged connections between an overlapping lid position and a generally upright position defining side walls for the set-up window and stand.

4. A portable photographic transparency viewer comprising a box-like container body having bottom, end and side walls, a pair of rectangular lids each articulately connected to a side wall of the container, a rectangular viewing-window articulately connected at one of its ends to one of the end walls, a rectangular stand for the window free at one end and articulately connected at its other end to the other end of the window, the window and its stand being movable about its articulated connections between a collapsed boxed condition with the stand folded under the window and a set-up condition with the window and stand triangularly disposed with reference to the container body, the lids being movable in opposing directions about their articulated connections between an overlapping lid position and a generally upright position defining side walls for the set-up window and stand and shading blinds for the set-up window.

5. The portable viewer of claim 1 in which interior faces of the container walls, the interior face of the stand and the interior faces of the lids are surfaced to define diffusion reflectors.

6. In the portable viewer of claim 2, an electric light source holder within the container body articulately connected to the container bottom and movable between a collapsed boxed condition to a window illuminating set-up condition.

7. The portable viewer of claim 6 in which the electric light source holder comprises an electric receptacle articulately connected to the container bottom and a light source receiving receptacle rotatable in the electric receptacle.

8. The portable viewer of claim 4 in which the transverse dimensions of the viewing window and its stand are less than those of the end walls sufficient to leave a ventilating air space between the window (and its stand)

and the upright lids when these parts are in set-up condition.

9. In the portable viewer of claim 2, an electric light source holder within the container body, the window, its stand and the lids when in set-up condition and the container body defining an all-around enclosure for the light source when in use.

10. In the portable viewer of claim 2, an electric light source holder within the container body comprising an electric receptacle articulately connected to the container bottom and a light source receiving receptacle rotatable in the electric receptacle, said holder being movable between a collapsed boxed condition to a window illuminating set-up condition, the window, its stand and the lids when in set-up condition and the container body defining an all-around enclosure for the light source when in set-up condition.

11. The portable viewer of claim 1 in which the window comprises front and rear window plates spaced by an insulating air pocket, the rear plate comprising a translucent light diffusing element.

12. The portable viewer of claim 11 in which the front plate comprises a transparent plate adapted to receive a photographic transparency.

References Cited in the file of this patent

UNITED STATES PATENTS

| | | |
|---|---|---|
| 1,591,957 | Berry | July 13, 1926 |
| 1,796,432 | Barlatier | Mar. 17, 1931 |
| 1,846,533 | Thompson | Feb. 23, 1932 |